3,042,498
APPARATUS FOR ROASTING SULFIDES
George Hugh Charles Norman, Copper Cliff, Ontario, Canada, assignor to The International Nickel Company, Inc., New York, N.Y., a corporation of Delaware
Filed May 6, 1958, Ser. No. 733,312
Claims priority, application Canada June 4, 1952
6 Claims. (Cl. 23—277)

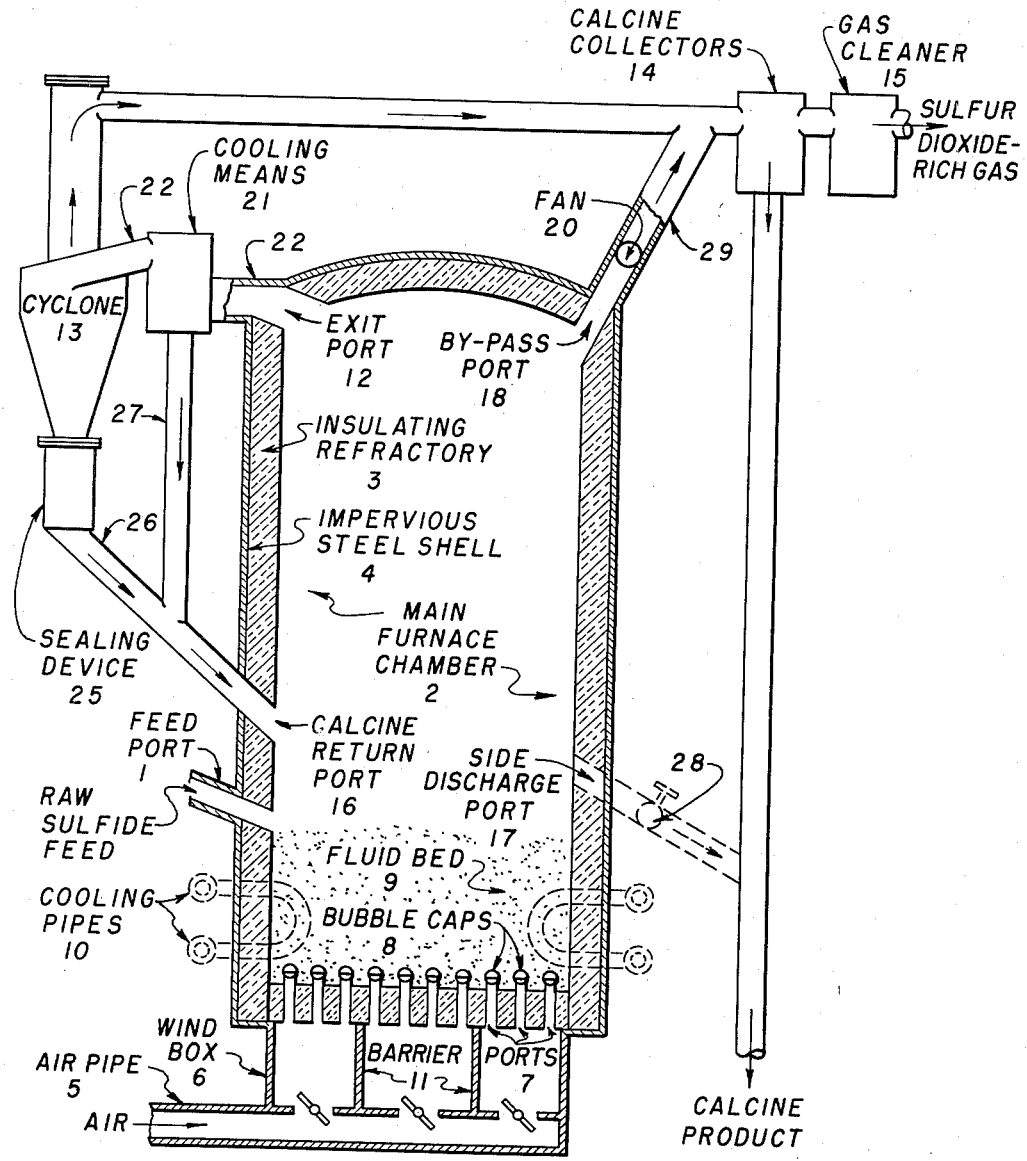

The present invention relates to an improved apparatus for roasting sulfides and, more particularly, the present invention provides an improved apparatus comprising a furnace of novel structure for suspension roasting finely-divided sulfide materials to obtain calcine of exceptionally low sulfide-sulfur content while maintaining high treatment rates per unit of hearth area.

It is well known that conventional suspension-roasting, i.e., flash roasting or fluid-bed roasting, of sulfide materials, such as pyrite, pyrrhotite, etc., has possessed certain limitations. In order to obtain a desired low sulfur content in the calcine, the art has heretofore found it necessary to employ relatively low feed rates per unit size of roaster. Where high feed rates and correspondingly high gas velocities have been employed, the calcined products had undesirably high sulfide-sulfur contents due to the extremely short retention time of the finer fractions of calcine in the roasters, and, if any great increase in feed rate were attempted, fluidized bed roasters become inoperative as such due to loss of the bed. Sulfide concentrates having higher initial sulfur contents and having finer particle sizes have become increasingly available in recent years for roasting and, as a result, the fluid-bed and flash-roasting techniques have come into prominence in spite of the limitation discussed hereinbefore.

It has now been discovered that finely-divided sulfide materials, particularly iron sulfides, can be suspension roasted at high feed rates and at high oxidizing-gas velocities either by flash-roasting or by fluid-bed roasting techniques, to obtain a roasted sulfide product of exceptionally low sulfide-sulfur content and gases rich in sulfur dioxide by employing a suspension-roasting apparatus comprising a furnace and having a special construction which provides for high retention time of the sulfides in the roasting furnace.

It is a main object of the present invention to provide an improved suspension-roasting apparatus comprising a furnace for the substantially complete roasting of finely divided sulfides at very high throughput rates per unit of hearth area.

Another object of the invention is to provide an apparatus comprising a furnace for suspension roasting finely-divided sulfides whereby fractions thereof are recovered from the exhaust gases and circulated through the roasting operation in an amount bearing a minimum ratio relationship to the amount of raw sulfide feed entering the roasting furnace.

It is a further object of the invention to provide a new apparatus comprising a furnace for suspension roasting finely-divided sulfides at high throughput rates, from which a roasted calcine of exceptionally low sulfide-sulfur content is obtained.

The invention further contemplates providing a unique apparatus comprising a furnace for suspension-roasting finely-divided sulfides from which gas rich in sulfur dioxide is obtained.

Other objects and advantages will become apparent from the following description taken in conjunction with the accompanying drawing wherein there is shown an elevational view partly in section of an embodiment of a suspension-roasting furnace of the fluid-bed type in which the novel process provided by the present invention can be carried out as indicated in the drawing.

Generally speaking, the present invention contemplates a unique apparatus, an embodiment of which is schematically depicted in the drawing, for roasting finely-divided sulfide materials at elevated temperatures to oxidize said sulfides to calcines containing very little sulfide-sulfur. The autogenous suspension-roasting process performed in the apparatus of the present invention yields the foregoing improved results at unusually high throughput or feed rates and high oxidizing-gas velocities by virtue of passing at least a major portion of the solids-laden, sulfur dioxide-rich exhaust gases through a gas-solids separator which separates the exhaust gases from the bulk of the entrained solids. The recovered solids are returned to the suspension roaster in an amount bearing a ratio relationship to the amount of raw sulfide feed being introduced into the roasting operation such that a recirculating feed of solids is built up in the suspension roaster in an amount substantially greater than the amount of incoming raw sulfide feed.

The exhaust gases, now free from the bulk of the entrained solids, may be treated to recover most of the remaining entrained solids as calcine product. The now substantially solids-free exhaust gases may then be treated in dust collectors to recover therefrom the small amounts of the finest dust still remaining in the gases.

Advantageously, a further and minor portion of solids-laden exhaust gases may be removed separately from the roaster and solids separated from this minor portion of solids-containing exhaust gases may be withdrawn as calcined product of low sulfur content.

Calcine may, if desired, be removed either intermittently or continuously from a port or ports located at various levels in the side of the roaster, in order to regulate the amount of material in the roaster bed. Roasting temperature, exposure time of the material in the roaster and the free oxygen content of the oxidizing gas are the variable operational factors controlling the desired low sulfur content in the calcine product. By employing the unique suspension-roasting structure provided by the present invention, permeable calcines having satisfactory chemical reactivity in subsequent metal-extraction operations, such as selective reduction followed by ammoniacal leaching as disclosed in U.S. Patent No. 2,556,215 or selective sulfation followed by water leaching as disclosed in U.S. Patent No. 2,719,082, are obtained. The low sulfide-sulfur content of calcined iron sulfides produced by employing the present apparatus, if initially low in contaminating constituents such as non-ferrous metals and silica, is particularly suitable as high-grade iron oxide for direct smelting to iron and steel without further desulfurization. Where the iron ore is required in agglomerated form, methods such as briquetting, etc., can be employed.

More particularly, the present apparatus involves a furnace for suspension-roasting finely-divided sulfides, such as iron sulfide concentrates, advantageously having a coarseness not more than about 20% plus 65 mesh and containing at least 15% sulfur, with oxidizing gases containing free oxygen, such as air, at temperatures between about 1000° F. and about 1800° F., and particularly between about 1100° F. and about 1600° F., to decrease the sulfur content, and particularly the sulfide-sulfur content, of the roasted sulfides to the extent required, depending upon the particular processing and end-use requirements subsequent to roasting. Thus, in roasting iron sulfides to obtain a calcine suitable for direct processing to high-grade iron ore, calcines having very low sulfur contents are required. On the other hand, if the calcines are to be subsequently selectively-sulfated or selectively-reduced prior to leaching, as discussed hereinbefore, somewhat higher sulfur contents can be tolerated. One of the marked advantages obtained by employing the novel apparatus provided by the present invention as compared to prior art apparatus is that, for comparable throughput or feed rates and roasting temperatures, calcines containing very much lower sulfide-sulfur contents are obtained. This is clearly shown by the data given in Tables I, II, III and IV presented and discussed hereinafter.

In fluid-bed roasting finely-divided sulfides in the present apparatus, the relation between feed rate and furnace cross-section is such that gas velocities are about 2 to about 6 feet per second in the upper region of the roasting chamber. Even higher gas velocities may be employed in certain cases depending upon the particular particle size of the sulfide material being roasted, upon the feed rate of the sulfide material into the furnace, and upon other factors as those skilled in the art will understand. More usually, gas velocities of about 2 to about 5 feet per second will be employed. The pressure of oxidizing gas introduced into the bottom of the furnace is broadly between about 1 and about 5 pounds per square inch. In any specific case, however, the actual depth of the fluid bed places a minimum limit on the gas pressure to be employed to obtain the desired quantity of gas, as those skilled in the art will readily understand.

The exhaust gases when analyzed on a dry basis normally contain more than 7% sulfur dioxide, less than 10% free oxygen, and the balance mainly nitrogen. Where a high waste heat recovery is desired or where the gases are processed for sulfur recovery, the gases when analyzed on a dry basis usually contain 10 to 13% sulfur dioxide when pyrrhotite is being roasted, corresponding to little or no free oxygen in the exhaust gas. It was found that even with roaster temperature under 1500° F., calcine containing less than 0.1% sulfide-sulfur can regularly be produced from a 37% sulfur pyrrhotite concentrate when controlling the oxygen in the roaster exhaust gas at about 1% oxygen. This oxygen content corresponds to use of only about 5% excess air over that required to produce $Fe_2O_3$ and $SO_2$. A fluidized bed roaster has also been operated on a 20-ton per day scale using oxidizing gas containing free oxygen in an amount insufficient to oxidize the iron in the sulfide completely to hematite ($Fe_2O_3$), thereby producing calcine containing some of the iron as magnetite, although still containing less than 0.25% sulfur, and producing a gas virtually free from oxygen.

The bulk of the calcine carried out of the furnace with the exhaust gases is separated from these gases by means of a gas-solids separator, e.g., a cyclone-type separator (which, for convenience, may be called a primary or circulation solids-gas separator throughout the specification and claims), and returned, via a sealing device, to the roasting operation in amounts equal to not less than about two times the amount of incoming unroasted sulfide feed. In prior art processes employing conventional suspension roasters, some processes and roasters involved returning to the roaster the dust collected from the outgoing gases. However, in all such cases, this dust has normally been only the dust unavoidably present in the gas and no prior art efforts were made to deliberately increase the solids content of the outgoing gas to a level very much higher than the raw feed introduced into the furnace nor to provide means for circulating to the roaster an amount of recovered solids equal to not less than about two times the amount of incoming raw feed. Also, the known prior art processes and apparatus differ even more in nature. For example, in U.S. Patent No. 2,650,159 the minor amount of dust carried over from one fluid-bed is returned to a second fluid-bed. In U.S. Patent No. 2,637,629 the minor amount of dust is returned by small internally disposed cyclones.

By circulating the calcine through the roasting operation in the ratio of not less than about 2:1, preferably at least about 5:1, and advantageously not more than about 20:1, relative to the fresh incoming raw sulfides, sufficient retention time under roasting conditions is obtained to secure a high degeree of desulfurization, even at high feed rates of the order of 1 to 2 tons per day per square foot of roaster hearth area. Sulfur present in the calcine product other than sulfide-sulfur is generally in the form of sulfate-sulfur and water leaching to remove this sulfur and/or to recover any sulfated metal values can be employed if desired. Where sulfate-sulfur is objectionable in the product it may also be decreased by employing higher temperatures than those of the examples disclosed hereinafter and by avoiding undue exposure of the calcine to sulfur-containing gases at intermediate temperatures during cooling.

When attempting to roast at high feed rates and high gas velocities in conventional fluid-bed roasters in which no efficient means is provided for returning to the roaster the material carried out in the gas, a fluidized bed of material being roasted cannot be maintained and the roaster empties itself. Consequently, important advantages of fluidized-bed roasting, including retention of the ore in the furnace under roasting conditions for appreciable lengths of time, ability to withstand prolonged operational interruptions without serious loss of temperature, and stability of operation, are lost. Due to the greatly decreased retention time of the material being roasted under appropriate conditions but at high oxidizing gas velocities, the sulfide-sulfur content of the calcine material will remain undesirably high. By providing the novel means contemplated by the present invention for returning to the roaster most of the material carried out in the exit gases, a gas-permeable dense phase or bed can be maintained in the roaster which, in combination with the aforesaid means more completely described hereinafter for controlling the proportion of solids withdrawn from the circuit, permits feed rates and oxidizing gas velocities much higher than have been possible heretofore when roasting fine sulfide concentrate.

Previous investigators have presumably made an effort to determine the maximum capacity of their fluid-bed roasters, and in course of so doing would raise feed rate and gas velocity to the point where, depending on the fineness of the material being treated, a fluid-bed could not be retained due to its being blown from the furnace. It has not previously been realized that use of an efficient gas-solid separator for circulating back into the roaster a large portion of the solids, deliberately blown out of the furnace by virtue of high gas velocity, would permit much higher feed rates while retaining the usual advantages of suspension-roasting and, at the same time, would permit at both moderate and high feed rates a much more complete desulfurization of the calcine than has heretofore been possible, especially when employing temperatures at which a reactive calcine is produced.

A bed, containing relatively coarse particles not readily blown out of the roaster, can be employed.

As an optional feature of the present invention, the desired depth of bed or dense phase in the suspension roaster can be controlled by means to by-pass the circulation solids-gas separator in such a manner that a controlled proportion of the solids-containing exhaust may be directly withdrawn from the roasting operation without passing through the circulating gas-solids separator. However, if it is desired to maintain constant the amount of dense body of material in the roaster, i.e., maintain a constant bed depth, the fraction of solids-containing exhaust gas permitted to by-pass the circulating solids-gas separator must be less than the reciprocal of the ratio of circulated solids to incoming raw feed. For example, when employing a circulating load of recovered solids equal to 20 times the incoming raw feed, less than one-twentieth of the total exhaust gas can be withdrawn through the by-pass, otherwise the amount of dense material within the roaster would be depleted. The circulation rate can be controlled by employing any of the well known means for regulating the volume of gas by-passing the circulating solids-gas separator. For example, by means of a damper, fan, or other type of control unit in the by-pass, the solids-containing roaster exhaust gas can be split into two fractions with the major volume bearing a definite relationship to the minor volume. To obtain calcines that are highly desulfurized, and to maintain high feed rates, it is desirable that the ratio of the major volume of gas passing through the circulating solids-gas separator to the volume by-passing it, should not be less than about 2:1, preferably at least about 5:1, and advantageously not more than about 20:1. By-pass calcine can be recovered from the exhaust gas in the same operation employing the same equipment as calcine recovered from the gas leaving the circulating operation and equipment; or, the by-pass calcine can be recovered separately.

Where delivery of the finished calcine at a high elevation is not required, the amount of dense phase in the roaster may be regulated by withdrawing calcine at a selected level or levels from the side of the roasting chamber above the bed level except when operating the roaster at below normal capacity. When such withdrawal of calcine from the side of the roasting chamber is employed, it normally is continuous, but it may be intermittent. The ports for controlled withdrawal of calcine from the roaster are situated well above the bed level, in contrast to the overflow ports employed in conventional fluid-bed roasters in which roasted material is discharged through an overflow at the upper rim of the turbulent bed. A screw discharge, level with the top of the bed, has also been found useful in maintaining a constant bed level, especially when operating the roaster at below normal feed rate.

It has also been found that by utilizing the high circulating loads characteristic of the present invention, the operating range of feed rates over which the roaster will perform satisfactorily is markedly increased.

I have no knowledge of any prior art processes for roasting of iron sulfides (even when employing high temperatures of up to 2000° F. which would tend to clinker the calcine and render it unfit for subsequent leaching) which permit as complete a sulfur elimination under commercial conditions as does the present process.

The temperature of the roaster can, if desired, be effectively controlled by various means, such as by the use of cooling coils inserted in the calcine bed, the heat extracted from said bed via the cooling coils being employed to generate steam. Another means of controlling the temperature of the roaster, particularly when the temperature is to be maintained between about 1100° F. and about 1600° F., is partially to cool the calcine recirculated to the roaster. In cases where the oxygen content of the exhaust gas is not critical, temperature of the roaster may be finally adjusted by variation in the ratio of air or water to sulfide feed introduced into the furnace.

An embodiment of a suspension roasting apparatus including a kiln provided by the present invention, namely a roaster of the fluid-bed type, is depicted in the drawing. Finely-divided sulfide feed is introduced into the main or roasting chamber 2 of the roaster through at least one feed port 1 which may be provided with suitable means to prevent gases flowing out through the feed port or ports. The chamber 2 may be constructed of insulating refractory lining 3 held within an impervious steel shell 4. The furnace chamber 2 may be provided with suitable burners (not shown), well known to those skilled in the art, for the purpose of pre-heating the chamber to a selected temperature in order to initiate the exothermic roasting reaction between the finely-divided sulfides which are undergoing autogenous suspension roasting and the free oxygen of the oxidizing gas. Oxidizing gas containing free oxygen, for example, air, for roasting the finely-divided sulfides in suspension in chamber 2, is introduced under a suitable pressure, which may be, for example, about 2 pounds per square inch, through supply pipe 5 to wind box 6, from where it flows into the preheated furnace chamber 2 through ports 7. The ports 7 may be fitted with devices for preventing back flow of calcine when oxidizing gas flow is stopped, such as conventional bubble caps 8. Calcine is permitted to accumulate in the form of a fluidized bed 9, which may have a depth, for example, of about 1 to 4 feet, and which may be prevented from rising further by means described hereinafter. There may be a rather indistinct line of division between the fluidized bed in the lower portion of the roasting chamber 2 and the solids-laden gases in the upper portion of the roasting chamber due to the high gas velocities and the heavy dust burden of the gases employed in the roaster of this invention. Temperature of the fluid-bed may be controlled by means of cooling pipes 10, located in the fluid-bed which may also serve to produce steam for useful purposes, and by means for adjustment in the ratio of oxidizing gas, such as air, or water to ore introduced into the furnace as well as by other means. Temperature of the fluid-bed can also be controlled by separate regulation of the oxidizing gas entering the zone of the roaster most closely associated with the cooling pipes 10. As depicted in the drawing, the control of the oxidizing gas may be obtained by dividing the wind box 6 with barriers 11 permitting regulation of the flow of oxidizing gas from the oxidizing gas supply pipe 5 to each of the portions of the wind box formed by the barriers 11. The temperature of the roaster may also be controlled by partially cooling the calcine recirculated to the roaster, as pointed out hereinbefore. Hot combustion gases, rich in $SO_2$ and entrained solids, rise to the exit port 12 in the upper region of the roasting chamber 2 from where they are passed via a conduit 22 to the primary or circulating solids-gas separator, e.g., cyclone 13, which desirably is located externally of the roasting chamber 2. From the primary solids-gas separator 13 the gases may proceed to a secondary solids-gas separator, e.g., calcine collector or collectors 14, and then to a gas cleaner 15. Advantageously, at least 80% of the solids leaving the furnace via port 12 may be returned via calcine return port 16 to the main furnace chamber. The solids removed from the exhaust gases in the recirculation solids-gas separator 13 may be passed through a sealing device 25 at the bottom of the solids-gas separator 13 and returned to the roasting chamber 2 via solids-return conduit 26 and calcine return port 16, which advantageously may be located in the roaster wall at a level above the raw sulfide feed port or ports 1. When the temperature of the roaster is to be controlled by partially cooling the calcine to be recirculated to the roaster, a cooling means 21 is provided which advantageously may be located in the line of the conduit 22 between the exhaust port 12 and the primary or circulation solids-gas separator 13 as depicted in the drawing. Solids separating out from the exhaust gases in the cooling means 21 may be returned to the roasting chamber 2, for example, via conduit 27 connecting the cooling means 21 with the solids-return conduit 26. The aforementioned location of the cooling means 21 is particularly advantageous because the exhaust gases leaving port 12 as well as the solids to be recirculated to the roaster are thereby cooled. However, the means for cooling solids to be circulated back to the roaster may be located anywhere in the solids recirculating system from exhaust port 12 to return port 16, comprising line or conduit 22, primary solids-gas separator 13 and solids-return line or conduit 26.

As pointed out hereinbefore, the depth of fluidized bed present in the furnace may be controlled by providing a side-discharge port or ports 17, having controlled opening and closing means 28, at various levels above the level at which it is desired to maintain the top of the fluid bed. If desired, a deflector plate (not shown) may be employed in conjunction with each such port 17. The particular port or ports to be opened during the roasting operation to control the height above the fluid bed at which the calcine is to be side-discharged from chamber 2 depends upon the particular operational factors of the process, such as throughput rate, particle size of feed, size of the opening of port 17, degree of sulfide-sulfur elimination required, roasting temperature and circulation ratio employed, etc. For example, a 10-inch diameter side-discharge port situated 7 feet above the furnace hearth has been employed to maintain a 3-foot bed in a 7½ foot diameter furnace when roasting pyrrhotite concentrate having a fineness of 5% plus 200 mesh. Forced withdrawal of solids-laden gases via port 17 is unnecessary since a surprising amount of solids enters port 17 and is removed by gravity.

As disclosed hereinbefore, the depth of the fluid bed can be maintained constant or varied by controlling the amount of solids-laden exhaust gas by-passing the circulation solids-gas separator 13 in various ways. In the embodiment depicted in the drawing, a by-pass port 18 is provided in the upper region of the roasting chamber 2. The by-pass port 18 advantageously may be of a smaller size than the exit port 12 leading to the primary or circulating solids-gas separator 13, such that the bulk or major portion of the solids-containing exhaust gases pass to the circulating solids-gas separator 13 and a further and minor portion of the solids-containing exhaust gases is separately withdrawn from the roaster through by-pass port 18. The exhaust gases withdrawn through by-pass port 18 are passed through exhaust gas line or conduit 29 to the secondary calcine collectors 14 where the entrained solids are withdrawn as a calcine product of low sulfur content. If desired, the line or conduit 29 may conduct the minor portion of solids-laden exhaust gases to a calcine collector (not shown) other than the collectors 14 for separate removal and withdrawal of the entrained solids from this minor portion of the exhaust gases. A fan 20 or some other type of control unit may be provided in the exhaust gas line or conduit 29 and serves as means for regulating the relative flow of solids-laden exhaust gases out of the two exhaust ports 12 and 18. The gases passing upwards through the roaster may be maintained at such high rates and velocities as will entrain and carry out of the roaster the entire roasted feed particles which may then be separated from the exhaust gases and withdrawn from the apparatus as calcine product of low sulfur content. The recovery of the entire product as finely-divided solids separated from the exhaust gases is exemplified in the data presented in the third test run of the aforementioned Table I. Accordingly, the suspension roaster advantageously may be operated so that regulation of the circulating load of solids may be obtained by proportioning of the two portions of solids-laden exhaust gases to each other. Thus, a controlled proportion of the solids-laden exhaust gases may be withdrawn directly from the roaster through by-pass port 18 without passing through the circulation solids-gas separator 13 so that the volume of exhaust gases withdrawn from the roasting operation via the circulation solids-gas separator 13 may be not less than about twice the volume of exhaust gas directly withdrawn from the roaster through by-pass 18 without passing through the circulation solids-gas separator.

Equilibrium between the amounts of incoming raw sulfide and outgoing calcine may be controlled by the aforementioned means for withdrawing calcines from the roaster.

The sulfur-dioxide-rich gases are substantially cleaned of entrained solids by use of dust-recovery equipment or gas cleaner 15 prior to treatment of the gases for the recovery of sulfur dioxide therefrom. Solid residue, including oversize particles which are not entrained in and removed by exhaust gases leaving the furnace chamber, may be removed from the hearth of the furnace chamber by any suitable means, such as a clean-out port (not shown) located at or near the hearth level of the furnace chamber.

In carrying the invention into practice on ore which is to be subsequently leached, it is preferred to roast the finely-divided iron sulfide concentrates, e.g., pyrrhotite, at a coarseness of not more than approximately 10% plus 200 mesh in a roaster of the fluid-bed type such as described hereinbefore and illustrated in FIG. 1. In cases where the calcine is not to be subsequently leached, sulfide feeds of much coarser particle size can be successfully treated by the present process.

For the purpose of giving those skilled in the art a better understanding of the present invention and the marked advantages accruing therefrom, the following illustrative example is given:

Finely-divided pyrrhotite concentrates containing 36% sulfur and about 5% silicate gangue was fed into a vertical fluid-bed roaster, preheated to a temperature above about 1000° F., having an inside diameter of about 2 feet, and substantially of the structure shown in FIG. 1. The calcine was allowed to build up to bed depths between about 1 foot and about 3 feet. Air in an amount slightly in excess of that theoretically required to burn the pyrrhotite to $Fe_2O_3$ and $SO_2$ was introduced through a perforated hearth having conventional provision for prevention of calcine flow in the opposite direction when the air was shut off. The results obtained in roasting the aforementioned concentrates at various feed rates and at various temperatures within the temperature range provided by the present invention are given in the following table:

Table I

| Sulfide Feed Rate, lb./hr. | Roasting Temp., °F. | Exhaust Gas | | Calcine | | Percent Calcine Removed via— | | Bed Depth in Roaster, in. | Recirculation rate, lb./hr. | Ratio Recirculation v. Feed |
|---|---|---|---|---|---|---|---|---|---|---|
| | | Percent $SO_2$ | Percent $O_2$ | Percent Sulfide Sulfur | Percent Total Sulfur | Side Discharge port 17 | Calcine Collector 14 | | | |
| 150 | 1,400 | 10.6 | -------- | .09 | .75 | 51 | 49 | 26 | 900 | 6 |
| 150 | 1,600 | 12.4 | -------- | .03 | .34 | 74 | 26 | 31 | 1,100 | 7 |
| 230 | 1,550 | 13.0 | 1.6 | .10 | .25 | Nil | 100 | 10 | 5,000 | 22 |
| 330 | 1,510 | 13.0 | -------- | .17 | .38 | 34 | 66 | 10 | 20,000 | 60 |

The tests from which were obtained the data given in the foregoing Table I were repeated, with the exception that recirculation of calcine was omitted. The data obtained in this second series of tests are given in the following Table II:

Table II

| Sulfide Feed Rate, lb./hr. | Roasting Temp., °F. | Exhaust Gas | | Calcine | | Percent Calcine Removed via— | | Bed Depth in Roaster, in. | Recirculation, lb./hr. |
|---|---|---|---|---|---|---|---|---|---|
| | | Percent SO₂ | Percent O₂ | Percent Sulfide Sulfur | Percent Total Sulfur | Side Discharge Port 17 | Calcine Collector 14 | | |
| 150 | 1,490 | 12.1 | 2.5 | .54 | 1.55 | 86 | 14 | 16 | Nil |
| 150 | 1,600 | 11.0 | 3.5 | .44 | .80 | 81 | 19 | 16 | Nil |
| 330 ¹ | | | | | | | | | Nil |

¹ Inoperable in the fluid-bed roaster in this series of tests where recirculation of calcine is omitted.

A comparison of the data in Table I with those in Table II clearly discloses at once the marked advantages obtained by employing the high circulation ratios which are an essential feature of the present invention. Not only does the operation of the unique apparatus provided by the present invention obtain much more complete elimination of sulfur at moderate furnace feed rates, but it also permits the advantages of fluid-bed roasting to be realized at much higher feed rates in a furnace of given size than is possible when employing conventional fluid-bed roasting practice.

As another example of the unusually low sulfide-sulfur contents obtainable in calcines treated in accordance with the present invention, tests were conducted at moderate feed rate on roasting finely-divided pyrrhotite concentrate having the same composition disclosed in the previous example in a fluid-bed roaster having an internal diameter of 7½ feet. The test results are given in the following Table III:

Table III

| Sulfide Feed Rate, Tons/day | Roasting Temp., °F. | Exhaust Gas, Percent SO₂ | Calcine | | Approx. Percent Calcine Removed via— | | Ratio Recirculation v. Feed |
|---|---|---|---|---|---|---|---|
| | | | Percent Sulfide Sulfur | Percent Total Sulfur | Side Discharge Port 17 | Calcine Collector 14 | |
| 21 | 1,600 | 12-13 | .04 | .10 | 80 | 20 | 10 |
| 31 | 1,630 | 12-13 | .07 | .18 | 70 | 30 | 20 |
| 25 | 1,665 | 11-12 | <.05 | <.10 | 75 | 25 | 12 |

It is seen that in the tests reported in Table III remarkably high elimination of sulfur was obtained, together with a satisfactorily high recoverable sulfur dioxide content in the exhaust gas, in spite of a moderate roasting temperature of the order of about 1600° F. having been employed.

While the preferred roasted contemplated by the present invention is of the fluidized-bed type, it is also within the purview and scope of the invention to employ a roaster of the flash type in carrying out the present process. As in the case of the fluid-bed roaster illustrated in FIG. 1, the controlled circulation of the bulk of the solids carried out of the roaster by the exhaust gas is obtained in the same manner. Furthermore, if a roaster of the fluidized-bed type is employed, it is within the purview and scope of the invention that the dimensions may be varied according to use. For example, in some cases it may be advantageous, for proper fluidization, that the diameter of the shaft be smaller at the bottom or hearth.

It is to be observed that in industrial production of a low sulfur content permeable calcine it is also within the purview and scope of the invention to return the solids separated from the exhaust gases to the roasting operation in a weight ratio to the unroasted sulfide being fed to the roasting operation of up to about 60:1 as is shown by the data presented in Tables I and III. It is also to be observed that the data presented in Tables I and III show that roasted products containing an exceptionally low sulfide sulfur content are obtained when this weight ratio is not more than about 20:1.

As an example of the effectiveness of the present invention on producing calcines with a high degree of desulfurization when operating at very high feed rates in large scale practice; tests were conducted on finely-divided pyrrhotite. The roaster employed in these tests comprised a refractory-lined cylindrical shell 43 feet in height from hearth to roof brick. The inside diameter for 6 feet above the hearth was 22 feet, then increased to 26 feet through a vertical rise of 12 feet and remained at 26 feet up to the top of the roaster. A six foot diameter off-take or exhaust port in the roof led to the circulation or solids-return system which included a cooler, solids-gas separators and means for returning the separated solids back to the roasting operation. A second off-take, or by-pass port, 2½ feet in diameter led to the production system which included solids-gas separators that removed over 75% of total calcine production. The remainder of the calcine production was removed by secondary solids-gas separators treating the gas leaving both the circulation or solids-return system and the production system. Slurry feed of the sulfide material to be roasted was introduced into the roaster through four feed ports which discharged into the roaster 8.5 feet above the grate or hearth. Some water, additional to that in the slurry feed, was added at the feed ports in one of the tests for temperature control. The test results are given in the following table.

Table IV

|  | Test A | Test B |
|---|---|---|
| Feed rate in tons/day of pyrrhotite | 550 | 550 |
| Percent solids in pyrrhotite slurry feed | 75 | 75 |
| Percent sulfur in pyrrhotite | 34 | 34 |
| Percent plus 200 mesh | 11 | 11 |
| Roaster control temperature, °F | 1,400 | 1,380 |
| Volume of solids-containing gas in cubic feet per minute, to circulation system (at 1,320° F.) | 96,100 | 83,300 |
| Volume of solids-containing gas, in cubic feet per minute, to the production system (at 1,320° F.) | 13,800 | 18,000 |
| Ratio of major volume of solids-containing gas to circulation system/minor volume of solids-containing gas to production system | 7:1 | 4.6:1 |
| Additional water added to roaster | Nil | About 5 g.p.m.[1] |
| Calcines from production system: |  |  |
| Percent total-sulfur | 0.15 | 0.2 |
| Percent magnetite | 10 | 10 |
| Percent hematite | 90 | 90 |
| Gas from roaster: |  |  |
| Percent $SO_2$ (dry basis) | 13 | 13 |
| Percent $O_2$ | <0.2 | <0.2 |

[1] g.p.m.=gallons per minute.

This application is a continuation-in-part of my co-pending U.S. application Serial No. 356,756, filed May 22, 1953.

Although the present invention has been described in conjunction with preferred embodiments, it is to be understood that modifications and variations may be resorted to without departing from the spirit and scope of the invention, as those skilled in the art will readily understand. Thus, sulfides other than iron sulfide, e.g., nickel sulfide, cobalt sulfide, etc., can be successfully calcined by employing the novel apparatus provided by the present invention. Furthermore, although air per se has been disclosed as the preferred oxidizing gas, nevertheless, in certain cases, it may be desirable to employ oxidizing gases containing free oxygen in concentrations higher than the oxygen content of air, e.g., oxygen-enriched air. Likewise, certain cases may require that the free oxygen content of the oxidizing gas be less than that of air, e.g., air diluted with combustion gases or exhaust gases containing sulfur dioxide. Also, the finely divided solids may be introduced to the roaster in the form of a slurry, or means may be provided for introducing water separately for temperature control. Such modifications and variations are considered to be within the purview and scope of the invention and appended claims.

I claim:

1. An improved roaster for the fluid-bed roasting of metallic sulfides which comprises a single fluid-bed roasting chamber with provision for preheating said chamber; a port located in the wall of said chamber for feeding finely-divided solids thereinto; a hearth at the bottom of said chamber having at least one gas inlet port for introducing gas into said chamber; a first solids-gas exhaust port located in the upper region of said chamber for exhausting solids-containing gas therefrom; a primary cyclone-type solids-gas separator and a secondary solids-gas separator; a solids-gas intake port in aid primary separator connected to said first solids-gas exhaust port in said chamber; a solids-outlet port in said primary separator connected to a solids-inlet port in said chamber; a solids-gas outlet port in said primary separator connected to a solids-gas inlet port in said secondary solids-gas separator; a solids-outlet port for product discharge and a gas-outlet port in said secondary solids-gas separator; a second solids-gas exhaust port smaller than said first solids-gas exhaust port located in the upper region of said chamber connected to a solids-gas inlet port in said secondary solids-gas separator provided with means for controlling the flow of solids-containing gas therebetween.

2. The improved roaster set forth in claim 1 in which the hearth has a plurality of gas-inlet ports provided with bubble caps, in which a wind box is cooperatively associated externally with the roasting chamber in gas-tight connection with the gas-inlet ports in the hearth of said chamber, in which fluid-cooling means are provided in the lower regions of the roasting chamber above the hearth thereof, and in which a gas-cleaner is provided which has a gas-outlet port and which has a gas-inlet port connected to the gas-outlet port of the secondary solids-gas separator.

3. An improved roaster for suspension roasting sulfides which comprises a single refractory-lined chamber encased in an impervious steel shell; a port located in the wall of said chamber for feeding finely-divided solids thereinto; a port for introducing gas into said chamber; means for preheating said chamber; a port in the upper region of said chamber for exhausting solids-containing gases from said chamber; a primary solids-gas separator; a solids-gas intake port in said primary solids-gas separator connected to said port for exhausting solids-containing gases from the upper region of said chamber; a solids-outlet port in said solids-gas separator connected to a port in said chamber for introducing solids from said solids-gas separator into said chamber; and a solids-gas outlet port in said solids-gas separator connected to an intake port in a secondary solids-gas separator having a gas-outlet port and a solids-outlet port for continuously discharging fully reacted product.

4. An improved apparatus for fluid-bed roasting of metallic sulfides which comprises a single fluid-bed roasting chamber; a port located in the wall of said roasting chamber for feeding said finely-divided solids thereinto; a hearth at the bottom of said roasting chamber having at least one gas inlet port for introducing an oxidizing gas containing a substantial proportion of free oxygen into said roasting chamber; a first solids-gas exhaust port located in the upper region of said roasting chamber for removing exhaust gases having entrained therein finely-divided roasted solids; a primary solids-gas separator for separating from said exhaust gases the bulk of the finely-divided solids entrained therein; a solids-gas intake port in said primary separator connected to said first solids-gas exhaust port in said roasting chamber; a solids outlet port in said primary solids-gas separator; means for returning said separated bulk of the finely-divided roasted solids from said solids outlet port into said roasting chamber in an amount substantially greater than the amount of unroasted sulfides being fed into said roasting chamber; a secondary solids-gas separator; a solids-gas outlet port in said primary separator connected to a solids-gas inlet port in said secondary solids-gas separator; a solids outlet port for product discharge and a gas outlet port in said secondary solids-gas separator; a second solids-gas exhaust port located in the upper region of said roasting chamber; and means connecting said second solids-gas exhaust port in the roasting chamber to a solids-gas inlet port in said secondary solids-gas separator for conveying solids-containing exhaust gases from said roasting chamber to said secondary solids-gas separator and provided with means for controlling the flow of solids-containing exhaust gases therebetween.

5. An improved apparatus for fluid-bed roasting of metallic sulfides which comprises a single fluid-bed roasting chamber; at least one port located in the wall of said roasting chamber for introducing the metallic sulfide feed thereinto; a hearth at the bottom of said roasting chamber having at least one gas inlet port for introducing an oxidizing gas containing a substantial proportion of free oxygen into said roasting chamber; a first exhaust port located above the region of the fluid bed for exhausting a portion of the solids-laden roaster gases; means for separating the bulk of the roasted solids entrained in said portion of exhaust gases; means for returning said separated solids into said roasting chamber; means for cooling the solids of the exhaust gases after the removal of the solids-laden roaster gases from the roasting chamber and before the return of the separated solids to the roasting chamber; a second exhaust port located above the region of the fluid bed to withdraw another portion of the solids-laden roaster gases; means for separating the solids from said other portion of solids-laden roaster gas; means for discharging as a roasted product the solids separated from said other portion of solids-laden roaster; and means for regulating and controlling the proportioning of solids-containing exhaust gases entering the two exhaust ports.

6. The improved fluid-bed roasting apparatus as defined in claim 5 in which the means for cooling the solids is located between the first exhaust port and the means for separating the bulk of the roasted solids entrained in the exhaust gases.

References Cited in the file of this patent
UNITED STATES PATENTS

| | | |
|---|---|---|
| 2,348,009 | Johnson et al. | May 2, 1944 |
| 2,402,875 | Cornell | June 25, 1946 |
| 2,444,990 | Hemminger | July 13, 1948 |
| 2,526,486 | Krebs | Oct. 17, 1950 |
| 2,930,687 | Thornhill et al. | Mar. 29, 1960 |